UNITED STATES PATENT OFFICE.

SIDNEY GILCHRIST THOMAS, OF LONDON, ENGLAND.

MANUFACTURE OF ALKALINE PHOSPHATES.

SPECIFICATION forming part of Letters Patent No. 301,407, dated July 1, 1884.

Application filed January 24, 1884. (No specimens.)

*To all whom it may concern:*

Be it known that I, SIDNEY GILCHRIST THOMAS, a subject of the Queen of Great Britain and Ireland, residing at 9 Palace Chambers, Westminster Bridge, London, England, temporarily residing in the town of Algiers, Africa, have invented certain new and useful Improvements in the Manufacture of Phosphates; and I do hereby declare that the following is a full, clear, and exact description of the invention, which will enable others skilled in the art to which it appertains to make and use the same.

This invention relates to the manufacture of alkaline phosphates from the phosphorus contained in pig-iron. This phosphorus, which has to be removed before good steel or ingot-iron can be made from such iron, is at present a waste material, which is produced in large quantities and thrown away, though the commercial value of the phosphorus when recovered as a soluble alkaline phosphate by my process is nearly two dollars per unit.

In carrying out my invention I take molten pig-iron containing as much phosphorus as possible, and preferably as free as possible from silicon, the metal I prefer to use being the very hot molten metal obtained by first blowing a pig-iron very rich in silicon and phosphorus in an ordinary silicious-lined Bessemer converter. I run this molten metal into a lime or magnesia lined Siemens furnace, on the hearth of which there has been introduced a quantity of carbonate of soda or potash. Caustic alkali may be employed instead of the carbonate; but this is generally dearer and less effective. I protect the alkali from volatilization by a rough iron casing or plate or by covering it with limestone or oxide of iron. After the metal is run in I blow a further quantity of alkaline carbonate through a tuyere. In some cases it is preferable to blow in the whole quantity in this way. The amount of carbonate added must be not less than six times the weight of the total quantity of silicon and phosphorus contained in the pig. If nitrate of soda or potash is obtainable cheaply, some may be advantageously mixed with the carbonate to promote oxidation. As the alkali rises through and is mixed with the metal it unites with nascent phosphoric and silicic acid formed, and forms phosphate and silicate of soda and potash, which float on the metal as a slag. This slag is run off, and the metal is then finished as is usual in steel-making. The slag is run, preferably, while hot into lixiviating-tanks and the solution poured or siphoned off, and it may then be evaporated or precipitated with milk of lime, forming precipitated phosphate and caustic alkali.

Instead of using a Siemens furnace, a basic-lined Bessemer converter may be employed. In this case, also, I prefer to introduce the greater part or the whole of the alkaline carbonate through tuyeres, which are preferably horizontal, though either the ordinary bottom tuyeres or a vertical dipping tuyere may be employed for the purpose. Any alkali that is not introduced by the tuyeres should be protected by a rough iron casing from too rapid volatilization. The operation is continued till the metal shows by its fracture that no more phosphorus is left in it. The slag, consisting, mainly, of phosphate with some silicate of soda, is readily separated from the metal, and is treated as before described. I prefer to pass the gases through condensing-towers in order to recover any volatilized alkali.

Having fully described my invention, I wish it to be understood that I do not claim as part of my invention the use of alkaline carbonates as fluxes in any metallurgical operations; nor do I claim the use of carbonate of soda in metallurgical apparatus with silicious linings for any purpose, as such linings are destroyed by the action of the alkalies, and practically no phosphate is formed; nor do I claim the use of basic linings in Siemens or Bessemer converters or furnaces, this having been already patented to me in the United States; nor do I claim manufacturing soluble alkaline phosphates from the phosphorus contained in pig-iron by treating sodic or potassic carbonates with molten phosphoric pig-iron in a Siemens furnace or Bessemer converter or other furnace having a lime or magnesian lining; but

I claim—

1. The process of manufacturing soluble alkaline phosphates from phosphoric non-silicious molten pig-iron in a basic-lined Siemens furnace or Bessemer converter, which consists in pouring the molten metal upon the alkaline carbonate in such a furnace or vessel, turning on the blast, and with the blast introducing a further quantity of the carbonate, the alkali rising through the bath and combining with the nascent phosphoric and silicic acids and forming a slag of phosphate and silicate of soda and potash, then running off this slag while hot, lixiviating it, and evaporating or precipitating the solution with milk of lime, substantially as set forth.

2. The process of manufacturing soluble alkaline phosphates from phosphoric non-silicious molten pig-iron in a basic-lined Siemens furnace or Bessemer converter, which consists in pouring the molten metal upon alkaline carbonate covered with an iron casing or plate, or with limestone or oxide of iron, to prevent the too rapid volatilization of the carbonate before the acid has decomposed it, turning on the blast, and with the blast introducing a further quantity of the carbonate, the alkali rising through the bath, and combining with the nascent phosphoric and silicic acids and forming a slag of phosphate and silicate of soda and potash, then running off this slag while hot, lixiviating it, and evaporating or precipitating the solution with milk of lime, substantially as set forth.

SIDNEY GILCHRIST THOMAS.

Witnesses:
L. E. THOMAS,
EVA TINDALL,
*Both of Hotel Kirsch, Algiers.*